United States Patent
Wiedemann et al.

(10) Patent No.: US 9,895,807 B2
(45) Date of Patent: Feb. 20, 2018

(54) SETTING SYNCHRONIZED ROBOT MOVEMENTS

(71) Applicant: KUKA Roboter GmbH, Augsburg (DE)

(72) Inventors: Guenther Wiedemann, Gersthofen (DE); Manfred Huettenhofer, Meitingen (DE); Stefanie Deller, Augsburg (DE); Andreas Hagenauer, Friedberg (DE); Martin Weiss, Margertshausen (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 13/917,295

(22) Filed: Jun. 13, 2013

(65) Prior Publication Data
US 2013/0345867 A1   Dec. 26, 2013

(30) Foreign Application Priority Data

Jun. 19, 2012   (DE) .................... 10 2012 012 184

(51) Int. Cl.
*B25J 9/18* (2006.01)
*B25J 9/16* (2006.01)

(52) U.S. Cl.
CPC ............ *B25J 9/1682* (2013.01); *B25J 9/163* (2013.01); *B25J 9/1669* (2013.01);
(Continued)

(58) Field of Classification Search
CPC ...... B25J 9/1682; B25J 9/1656; B25J 9/1664; B25J 9/1665; B25J 9/1669; B25J 9/163;
(Continued)

(56) References Cited

U.S. PATENT DOCUMENTS

| | | | |
|---|---|---|---|
| 4,663,726 A | 5/1987 | Chand et al. | |
| 4,772,831 A * | 9/1988 | Casler, Jr. ............ | G05B 19/416 318/567 |

(Continued)

FOREIGN PATENT DOCUMENTS

| | | |
|---|---|---|
| CN | 1140119 A | 1/1997 |
| CN | 1382564 A | 12/2002 |

(Continued)

OTHER PUBLICATIONS

Sujan et al., "Visually Guided Cooperative Robot Actions Based on Information Quality", 2005, Spring Science + Business Media, Inc., Autonomous Robots 19, pp. 89-110.*

(Continued)

*Primary Examiner* — Spencer D Patton
(74) *Attorney, Agent, or Firm* — Wood Herron & Evans LLP

(57) ABSTRACT

An inventive programming means for programming a movement of a robot axis arrangement and a movement of at least one further robot axis arrangement is adapted to synchronize the pair of positions of the movement of the robot axis arrangement and the pairs of positions of the movement of at least one more robot axis arrangement, and while maintaining this synchronization, to specify at least another position between either one of these pairs of positions, which is not synchronized with another position of the hereby synchronized pair of positions.

14 Claims, 2 Drawing Sheets

(52) U.S. Cl.
CPC .............. *G05B 2219/39109* (2013.01); *G05B 2219/40307* (2013.01); *Y10S 901/08* (2013.01)

(58) Field of Classification Search
CPC .......... B25J 9/1666; B05B 2219/39109; B05B 2219/39131; B05B 2219/19117; B05B 2219/39121; B05B 2219/39124; B05B 2219/39132; B05B 2219/40307; Y10S 901/02; Y10S 901/06; Y10S 901/08; G05B 2219/39109; G05B 2219/39131; G05B 2219/39117; G05B 2219/39121; G05B 2219/39124; G05B 2219/39132; G05B 2219/40307
USPC ............. 700/245, 247, 248, 252; 901/2, 6, 8
See application file for complete search history.

(56) References Cited

U.S. PATENT DOCUMENTS

| | | | |
|---|---|---|---|
| 4,773,025 A * | 9/1988 | Penkar | G05B 19/416 318/568.2 |
| 4,794,540 A * | 12/1988 | Gutman | G05B 19/4103 700/187 |
| 5,140,236 A | 8/1992 | Kawamura et al. | |
| 5,254,923 A | 10/1993 | Kanitani | |
| 2004/0199290 A1 * | 10/2004 | Stoddard et al. | 700/248 |
| 2010/0008754 A1 * | 1/2010 | Hartmann | G05B 19/4103 414/800 |

FOREIGN PATENT DOCUMENTS

| | | |
|---|---|---|
| CN | 1406781 A | 4/2003 |
| EP | 0 417 337 A1 | 3/1991 |
| WO | 89/00306 A1 | 1/1989 |

OTHER PUBLICATIONS

German Patent Office; Search Report in German Patent Application No. 10 2012 012 184.9 dated Feb. 26, 2013; 8 pages.
ABB Robotics; Publication Entitled "Anwendungshandbuch MultiMove" dated 2011; 112 pages.
ABB Robotics; Publication Entitled "Bedienanleitun RobotStudio" dated Oct. 2011; 554 pages.
Chinese Patent Office; Search Report/Examination Report in Chinese Patent Application No. 201310041373.9 dated Jul. 27, 2015; 20 pages.
European Patent Office; Search Report in related European Patent Application No. 13003132.1 dated Dec. 12, 2017; 8 pages.
Christina Brelin; Publication entitled Team-mates, ABB Multimove Functionality Heralds A New Era in Robot Applications dated Jan. 2005; 4 pages.

* cited by examiner

SETTING SYNCHRONIZED ROBOT MOVEMENTS

TECHNICAL FIELD

The present invention relates to a programming means and a method for programming synchronized movements of robots.

BACKGROUND

In particular, for process reasons it may be desirable or necessary that two or more robots take up pre-set positions at the same time, for example, to handle together a workpiece, in particular to process it, or to pass it to each other.

In this context, FIG. 1 shows an internally known principle of a corresponding synchronization between two robots, described by their revolute coordinates q1 and q2. In this case, starting from a previous position q1(Ti), the slower robot 1 moves at the maximum speed or acceleration to a subsequent predetermined position q1(T(i+1)). This yields the required traversing time $\Delta T=T(i+1)-Ti$. For the two robots to take up the synchronized positions q1(T(i+1)) and q2(T(i+1)) at a point in time, either the faster robot can be moved slower in the traversing time, i.e., can be moved without exploiting its maximum speed or acceleration (FIG. 1A)—here its speed is derived from the difference q2(Ti+1))−q2(Ti) and the traversing time $\Delta T$ required for the slower robot—or from its own maximum speed or acceleration and the remaining time spent waiting for the slower robot (FIG. 1B). This procedure can be successively repeated in order to synchronize a plurality of successive positions during a movement.

Based on this section-wise, forward-moving approach, the so far known programming means for programming synchronized movements necessarily provides for a strictly 1:1 bijective assignment of positions of the robots: every given position of a movement of a robot must be associated with a position of the movement of the other robot.

If, for instance, a further position is to be specified between two synchronized positions of a robot, such as to avoid collision, one must therefore also accordingly program for the other robot an actually unnecessary—dummy—position and synchronize it with the latter. This is not only complicated and error-prone, but it also unnecessarily restricts the flexibility of the other robot, such as the possibility to vary its movement for optimization.

SUMMARY

The technical task of the present invention is to improve the programming of synchronized robot movements.

Programming means in the context of the present invention can be configured by hardware and/or by software. It may in particular comprise, or in particular be, a program or a program module, a computer that is adapted for executing such a program, and/or a volatile or non-volatile storage medium, in particular a disc, on which such a program is stored. The programming means may in particular be formed by a corresponding lexicon or a corresponding lexicon or syntax of available commands or input options.

The said programming means allows to specify a movement of a robot axis arrangement and a movement of one or more additional robot axis arrangements.

In the present case, under a robot axis we understand in particular a joint axis of a robot, in particular an axis of rotation and a Cartesian axis and a movement axis in the working space of a robot. A (further) robot axis arrangement according to the present invention can comprise one or a plurality of robot axes of one or more robots. In a development, a (further) robot axis arrangement comprises one or more front axes of a robot, a (further) robot axis arrangement comprises one or more rear axes of this robot, in each case based on the kinematic chain formed by the robot basis. Thus, in a further development, a (further) robot axis arrangement can comprise one or more hand axis (rear axis) of a robot, in particular its fourth, fifth and/or sixth axis, a (further) robot axis arrangement can comprise its Cartesian or position axes, in particular its first, second and/or third axis (front axis). In particular, in an embodiment, a robot axis arrangement that represents an orientation of a TCP can be synchronized with a robot axis arrangement that represents a position of the TCP. Additionally or alternatively, a (further) robot axis arrangement can comprise one or more additional axes of a robot, in particular a seventh or further axes. According to an embodiment of the present invention, according to the shown example of application, a (further) robot axis arrangement can be a robot, a (further) robot axis arrangement can be another robot [sic]. In particular, more than two robot axis arrangements, in particular robots, can be synchronized.

Under programming a movement we understand in particular creating, modifying, saving, compiling, transferring to a controller, and/or executing a command sequence upon the execution of which the robot axis arrangements take up successively prescribed positions. In an embodiment, the movements of two or more robot axis arrangements can be provided by one or a plurality of controllers. For example, two robots can be respectively controlled by separate controllers, wherein the synchronization can be implemented by appropriate programming of the movements and communication of the controllers.

In an embodiment of the present invention, it is provided to synchronize by the programming means a pair of positions of the movement of the robot axis arrangement and a pair of positions of the movement of at least one other robot axis arrangement. In the present case, under a pair of positions we understand in particular two positions of movement of a (further) robot axis arrangement. In addition, other positions can be synchronized with each other, wherein in the movement two successive positions can form a pair of positions in accordance with the present invention, between which the movements of the two robot axis arrangements in the sense of the present invention are synchronized.

According to the invention, it is so provided in the method and the programming means are so designed as to selectively specify at least one other position between one of these pairs of positions while maintaining the synchronization, which additional position is not synchronized with another position between the pair of positions. It can, in particular, be provided that there does not exist another corresponding position at all between the thus synchronized pair of positions. Similarly, it can be provided in particular that there is at least one more corresponding position between the thus synchronized pair of positions, or at least is available, which however is not or need not be synchronized with the other position, which can selectively be programmed between the one pair of positions. In other words, the invented solution provides to cancel the former strictly bijective 1:1 assignment of positions in synchronized movements and to permit unrestricted assignment of synchronized positions.

In comparison to the previously known internal practice, the movement of the robot axis arrangement, in which according to the invention no more synchronized position is pre-determined, can thereby be advantageously improved, in particular can be flexibly optimized.

The invention may be implemented in various ways. So, for example, according to an embodiment the previous method can be further developed in that there is provided the option to optionally specify further not synchronized positions between the synchronous pairs of positions, and then, or after such programming, to the previous path or movement planning is executed completely from scratch.

In contrast, in an alternative, at least a movement, in particular all movements of the robot axis arrangements to be synchronized with each other can be programmed onward globally, i.e., not as previously in sections. This can be carried out in particular on the basis of spline functions, especially cubic splines or hermit splines. Although these are defined in sections, they define by their transition conditions the movement as a whole and globally. Accordingly, other global programming by other, also insofar globally defined functions or relations, such as polynomials, are conceivable, although—compared to spline functions—these tend to lead to a swinging.

If one or more movements are globally predefined, with the programming of other not synchronized positions between the synchronous pairs of positions, the movement planning advantageously need not be run from the beginning.

A globally specified movement can be or become specified between a start position and an end position, between which optionally one or more pairs of positions synchronous with positions of other movements and one or more synchronous positions can be specified. Here, a pair of positions, which is synchronized with a pair of positions of a movement of at least one other robot axis arrangement, corresponds to this start position and the end position, i.e., these robot axis arrangements begin and end their movements together. Similarly, a pair of positions, which is synchronized with a movement of at least a pair of positions of another robot axis arrangement, can be disposed between the starting position and the end position, i.e., the robot axis arrangements execute their movements only partially synchronously with each other.

In an embodiment, it is provided to selectively modify, in particular to cancel the synchronization between the pairs of positions of the movements of two or more robot axis arrangements. Additionally or alternatively, it can be provided in an embodiment to synchronize the positions of the movements of two or more robot axis arrangements, in particular the positions, which are arranged between a pair of positions, which is synchronized with at least one pair of positions a movement of another robot axis arrangement. In particular, therefore, as stated above, while maintaining a synchronization of an (outer) pair of positions of a movement of a robot axis arrangement and an (outer) pair of positions of at least one other robot axis arrangement, there can be selectively specified one or more positions between one of these pairs of positions, of which one or more positions can be synchronized with another position between the hereby synchronized pairs of positions. In other words, between two or more (outer) pairs of positions that are synchronized with each other, there can be specified one or more positions for one or more movements and selectively various of these positions can be synchronized or also not be synchronized with positions of the movements of other robot axis arrangements. This maximizes the flexibility of the programming of movements and advantageously allows their further optimization.

In an embodiment, the positions of movements of two or more robot axis arrangements can be synchronized with each other, where no exact stop is specified. In particular by a shift from progressing in sections to a global programming allows synchronizing any positions of these movements with each other, which further increases the flexibility.

BRIEF DESCRIPTION OF THE DRAWINGS

Other advantages and features will become apparent from the dependent claims and the embodiments. This is shown, partially in schematic form as follows:

DETAILED DESCRIPTION

Figure 1A:
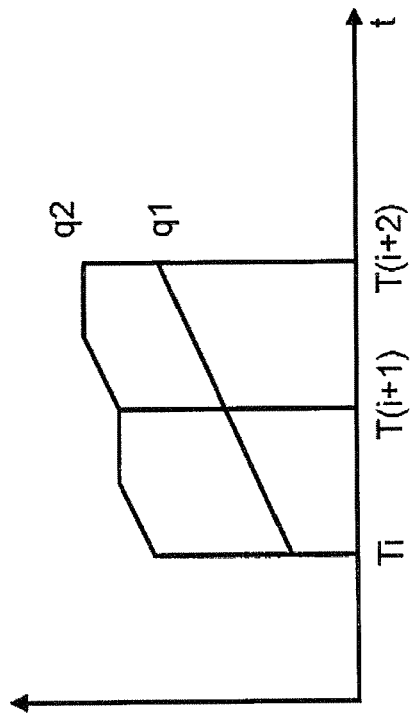
FIG. 1A: shows the synchronized movements of two robot axis arrangements according to a known in-house approach.
Figure 1B:
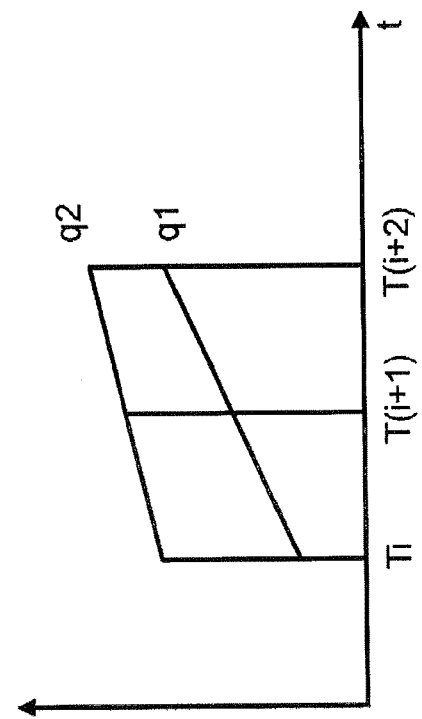
FIG. 1B: shows the synchronized movements of two robot axis arrangements according to another known in-house approach.

FIGS. 1A, 1B show, as observed in the introduction above, the timings of two robot axis arrangements, for ease of understanding, each with only one robot axis q1 or q2, wherein the two axes are synchronized at the times Ti, T(i+1), T(i+2), . . . , i.e., there are in each case (consecutive) times, in which robot axes q1, q2 are the respective predetermined positions. In FIG. 1A, the robot axis q2 moves slower, wherein it uses for the specified movement q2(T(i+1))−q2Ti the traversing time T(i+1) required for the robot axis q1, in FIG. 1B, it moves at the maximum speed and acceleration, waiting for the robot axis q1.

Figure 2:
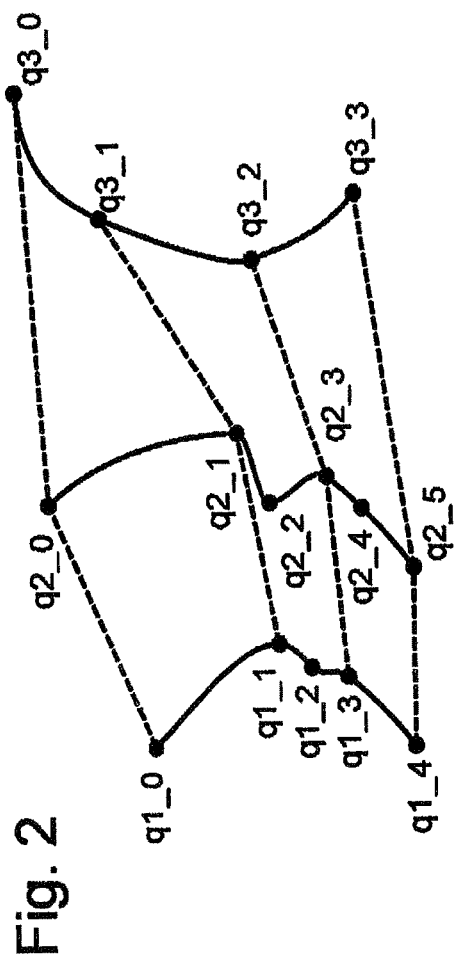
FIG. 2: shows the synchronized movements of three robot axis arrangements according to an embodiment of the present invention.

FIG. 2 shows—in contrast to FIG. 1 not over time but in the revolute coordinate or work space—which are defined by spline functions between the initial positions q1_0, q2_0 or q3_0 and the end positions q1_4, q2_5 or q3_3.

These start and end positions together form synchronized outer pairs of positions. By an inventive programming means or by a method according to the invention, on these spline functions there can be optionally specified further positions, for example, the positions (as depicted in FIG. 2) q1_1, q1_2, q1_3, q2_1 to q2_4 and q3_1, q3_2. The (relative to the outer pairs of positions) inner positions q1_1, q2_1, and q3_1 and q1_3, q2_3 q3_2 and subsequently synchronized, for example, by commands such as WITH $Sync_id[ ]=Mj with the identical identification Mj in all movements sequences of commands, while other positions q1_2, q2_2 and q2_4 can be specified—while maintaining this synchronization—either between these pairs of positions (q1_0, q2_0, q3_0; 20 q1_1, q2_1, q3_1), (q1_1, q2_1, q3_1; q1_3, q2_3, q3_2) and (q1_3, q2_3, q3_2; q1_4, q2_5, q3_3), in particular between the outer pairs of positions (q1_0, q2_0, q3_0; q1_4, q2_5, q3_3) that are not synchronized with another position between another movement.

One can see that, for example, by the optional programming of unsynchronized positions q1_2, q2_2 and q2_4, the movements of the robot axes q1, q2 can be changed without requiring, as was the case previously, any synchronous dummy positions to be specified in the movement especially of the robot axis q3. Without such dummy positions, whose programming is complex and error-prone, the movement of the robot axis q3 can be particularly flexibly—and thus better—optimized.

By way of example, let us explain an implementation: the first three movements can be specified, for example, using the path parameters sj, on which the spline functions are defined:

qj=q(sj)

Then these path parameters sj can be so determined that the preset positions to be synchronized are present at the same time:

sj(t) so that qj(sj(Ti))=qk_i for (i, k)={1, 2, 3};

In this way, optionally other positions can be specified by the global programming of movements based on spline functions. If these are to be synchronized, this can be achieved by additional conditions stated above, without the need to be partially synchronized from the beginning onward and thereby specifying dummy positions. Similarly, existing synchronizations can be cancelled. In particular, while maintaining the external synchronization optionally further positions can be specified between the outer pairs of positions, which are not synchronized with other positions of a movement of another robot axis.

It is evident that, in addition, no holds need to be specified for the positions to be synchronized—rather, in the synchronization times Ti . . . a non-zero path velocity d(sj)/dt can be available, in particular be specified.

LIST OF REFERENCE NUMERALS qi_j Pose j of the robot axis i

What is claimed is:

1. A computer for programming a movement of a first robot axis arrangement along a first globally predefined path and a movement of at least one second robot axis arrangement along a second globally predefined path, the computer comprising a non-transitory storage medium including program code that, when executed by the computer, causes the computer to:
   synchronize a pair of predetermined positions of the movement of the first robot axis arrangement on the first path and a pair of predetermined positions of the movement of the at least one second robot axis arrangement on the second path, and
   while maintaining synchronization between the predetermined positions on the first and second paths, to specify at least one other position of the movement of the first or second robot axis arrangements between either one of the synchronized pairs of positions, wherein the at least one other position is not synchronized with another position between the synchronized pairs of positions of the first and second robot axis arrangements.

2. The computer according to claim 1, wherein a robot axis arrangement comprises one or more robots.

3. The computer of claim 2, wherein the robot axis arrangement comprising one or more robots comprises at least one of front or rear axes of at least one robot.

4. The computer according to claim 1, wherein the computer globally specifies a movement between a start position and an end position.

5. The computer according to claim 4, wherein the pairs of positions of the movement of the first and second robot axis arrangements corresponds to the start positions and the end positions or is disposed between the start positions and the end positions.

6. The computer of claim 4, wherein the computer globally specifies the movement based on at least one spline function between the start position and the end position.

7. The computer according to claim 1, wherein the computer selectively modifies the synchronization between the pairs of positions of the movement of at least two robot axis arrangements.

8. The computer according to claim 1, wherein the computer synchronizes positions wherein the first and second robot axis arrangements do not have to stop at a predetermined position.

9. The computer according to claim 1, wherein
   movement of the first and second robot axis arrangements is globally specified based on spline functions.

10. The computer of claim 1, wherein the computer specifies the movement of the first robot axis arrangement and the movement of the at least one second robot axis arrangement as a whole, and not in a step-by-step manner.

11. A method for programming a movement of a first robot axis arrangement along a first globally predefined path and a movement of at least one second robot axis arrangement along a second globally predefined path by a computer having a non-transitory storage medium, the method comprising:
   synchronizing a pair of predetermined positions of the movement of the first robot axis arrangement on the first path and a pair of predetermined positions of the movement of the at least one second robot axis arrangement on the second path, and
   while maintaining synchronization between the predetermined positions on the first and second paths, specifying at least one other position of the movement of the first or second robot axis arrangements between one of the pairs of synchronized positions, wherein the at least one other position is not synchronized with another position between the synchronized pairs of positions of the first and second robot axis arrangements.

12. The method of claim 11, wherein the computer specifies the movement of the first robot axis arrangement and the movement of the at least one second robot axis arrangement as a whole, and not in a step-by-step manner.

13. A computer program product having program code stored on a non-transitory machine readable data medium, the program code configured to, when executed by a computer, cause the computer to:
   synchronize a pair of predetermined positions of the movement of a first robot axis arrangement along a first globally predefined path and a pair of predetermined positions of the movement of at least one second robot axis arrangement along a second globally predefined path, and
   while maintaining synchronization between the predetermined positions on the first and second paths, to specify at least one other position of the movement of the first or second robot axis arrangements between either one of the synchronized pairs of positions, wherein the at least one other position is not synchronized with another position between the synchronized pairs of positions of the first and second robot axis arrangements.

14. The computer program product of claim 13, wherein the computer specifies the movement of the first robot axis arrangement and the movement of the at least one second robot axis arrangement as a whole, and not in a step-by-step manner.

* * * * *